ization*

(12) United States Patent
Hough et al.

(10) Patent No.: US 11,385,681 B1
(45) Date of Patent: Jul. 12, 2022

(54) DOCKING COMPUTER STORAGE SYSTEM

(71) Applicant: Bretford Manufacturing, Inc., Franklin Park, IL (US)

(72) Inventors: Jack Hough, Arlington Heights, IL (US); Jeffrey Crull, McFarland, WI (US); Joel Kramka, Madison, WI (US); William Mathias, Madison, WI (US); Brett DeFever, Verona, WI (US); Simon Livingston-Jha, Madison, WI (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 17/392,777

(22) Filed: Aug. 3, 2021

Related U.S. Application Data

(60) Provisional application No. 63/061,311, filed on Aug. 5, 2020.

(51) Int. Cl.
*G06F 1/16* (2006.01)
*G06F 13/42* (2006.01)

(52) U.S. Cl.
CPC ........ *G06F 1/1632* (2013.01); *G06F 13/4282* (2013.01); *G06F 2213/0042* (2013.01)

(58) Field of Classification Search
CPC ............... G06F 13/4082; G06F 1/1632; G06F 2213/0042
See application file for complete search history.

(56) References Cited

U.S. PATENT DOCUMENTS

| 4,742,477 A | 5/1988 | Phillips et al. |
| 5,621,890 A | 4/1997 | Notarianni et al. |
| (Continued) | | |

FOREIGN PATENT DOCUMENTS

| CN | 202737489 U | 2/2013 |
| EP | 3358702 A1 | 8/2018 |
| (Continued) | | |

OTHER PUBLICATIONS

FUYL Tower lockncharge.com webpage accessed Oct. 25, 2019.
(Continued)

*Primary Examiner* — Henry Tsai
*Assistant Examiner* — Christopher A Daley
(74) *Attorney, Agent, or Firm* — Anderson Gorecki LLP

(57) ABSTRACT

A docking computer storage system has a plurality of docking bays for receiving laptop computers. A male USB-C connector is provided at the rear of each bay such that, when a laptop computer is inserted into the docking bay, the male USB-C connector in the docking bay will automatically engage a corresponding female USB-C connector on the laptop computer. The male USB-C connector is disposed on a floating subassembly which enables vertical and horizontal relative movement of the male USB-C connector within the docking bay. The floating subassembly has self-orienting inactive "dummy" male connectors configured to engage one or more female connectors on the laptop computer other than the USB-C connector. The self-orienting inactive "dummy" male connectors cause the male USB-C connector of the docking station to be properly aligned with the female USB-C connector of the laptop computer.

8 Claims, 6 Drawing Sheets

(56) References Cited

U.S. PATENT DOCUMENTS

| | | | |
|---|---|---|---|
| 6,008,621 A | 12/1999 | Madison et al. | |
| D441,513 S | 5/2001 | Mullen et al. | |
| 7,055,833 B2 | 6/2006 | Wixted et al. | |
| 7,160,113 B2 | 1/2007 | Mcconnell et al. | |
| 7,325,891 B1 | 2/2008 | Kinsley et al. | |
| 7,595,995 B2 | 9/2009 | Hock | |
| 7,800,914 B2 | 9/2010 | Dully | |
| 7,844,770 B2 | 11/2010 | Petrick et al. | |
| 8,066,242 B2 | 11/2011 | Potter et al. | |
| 8,243,455 B1 | 8/2012 | Raymond et al. | |
| 8,296,493 B1 | 10/2012 | Engelhardt et al. | |
| 8,320,110 B2 | 11/2012 | Chen | |
| D674,620 S | 1/2013 | Petrick et al. | |
| D675,622 S | 2/2013 | Petrick et al. | |
| D687,774 S | 8/2013 | Moore et al. | |
| 8,616,663 B2 * | 12/2013 | Ton | A47B 46/00 312/196 |
| 8,665,593 B2 | 3/2014 | Lev et al. | |
| 8,752,848 B2 | 6/2014 | Petrick et al. | |
| 8,833,716 B2 | 9/2014 | Funk et al. | |
| 8,837,157 B2 | 9/2014 | Kuhar | |
| 8,870,195 B2 | 10/2014 | Guasta et al. | |
| 8,901,879 B2 | 12/2014 | Wang | |
| 8,909,839 B2 | 12/2014 | Petrick et al. | |
| 8,934,254 B2 | 1/2015 | Petrick et al. | |
| 8,935,011 B2 | 1/2015 | Tischer | |
| 8,975,868 B2 | 3/2015 | Konkle et al. | |
| 9,030,828 B2 | 5/2015 | Lindblad et al. | |
| 9,104,373 B1 | 8/2015 | Lechman et al. | |
| 9,130,385 B2 | 9/2015 | Chen | |
| 9,163,779 B2 | 10/2015 | Funk et al. | |
| 9,182,793 B2 | 11/2015 | Ergun et al. | |
| 9,205,159 B2 | 12/2015 | Kim | |
| 9,207,722 B2 | 12/2015 | Ergun et al. | |
| 9,252,609 B2 | 2/2016 | Strauser | |
| 9,263,869 B2 | 2/2016 | Prince et al. | |
| 9,298,225 B2 | 3/2016 | Lindblad et al. | |
| 9,323,288 B2 | 4/2016 | Dresser | |
| 9,337,674 B2 | 5/2016 | Wang | |
| 9,343,916 B2 | 5/2016 | Emslie | |
| 9,441,782 B2 | 9/2016 | Funk et al. | |
| 9,484,752 B2 | 11/2016 | Jang et al. | |
| 9,665,135 B2 | 5/2017 | Wong et al. | |
| 9,680,319 B2 | 6/2017 | Tischer | |
| 9,876,373 B2 | 1/2018 | Hung et al. | |
| 9,887,488 B2 * | 2/2018 | Lee | H01R 13/6205 |
| 9,917,455 B1 | 3/2018 | Shipman et al. | |
| D814,410 S | 4/2018 | Emslie | |
| 9,997,932 B2 | 6/2018 | Li et al. | |
| D823,792 S | 7/2018 | Komoni et al. | |
| 10,044,203 B2 | 8/2018 | Ergun et al. | |
| 10,044,205 B1 | 8/2018 | Voelz et al. | |
| 10,056,768 B2 | 8/2018 | Hsu et al. | |
| 10,076,050 B2 | 9/2018 | Roberts | |
| 10,084,327 B2 | 9/2018 | Roberts | |
| 10,110,042 B2 | 10/2018 | Sultenfuss et al. | |
| 10,135,268 B1 * | 11/2018 | Gokcebay | H05K 7/1449 |
| 10,166,308 B2 | 1/2019 | Engelhardt et al. | |
| 10,225,734 B1 | 3/2019 | Shipman et al. | |
| 10,256,645 B1 | 4/2019 | Shipman et al. | |
| 10,261,551 B1 * | 4/2019 | Lin | G06F 1/181 |
| 10,283,983 B2 | 5/2019 | Mccaffrey et al. | |
| 10,283,984 B2 | 5/2019 | Maguire et al. | |
| D850,749 S | 6/2019 | Waldner | |
| 10,312,700 B2 | 6/2019 | Roberts | |
| 10,355,502 B2 | 7/2019 | Chen | |
| 10,396,574 B2 | 8/2019 | Maguire et al. | |
| 10,401,905 B2 | 9/2019 | Carnevali | |
| 10,409,237 B2 | 9/2019 | Hegewald et al. | |
| 10,411,468 B2 | 9/2019 | Tischer | |
| 10,412,853 B2 | 9/2019 | Dombrowski et al. | |
| 10,418,831 B2 | 9/2019 | Racenet et al. | |
| 10,424,949 B2 | 9/2019 | Chen et al. | |
| 10,439,408 B1 | 10/2019 | Bastiyali | |
| 2003/0111245 A1 | 6/2003 | Haggerty | |
| 2007/0049071 A1 | 3/2007 | Jackson et al. | |
| 2007/0228680 A1 | 10/2007 | Lindblad et al. | |
| 2010/0231104 A1 * | 9/2010 | Hernandez | A47B 46/00 312/249.12 |
| 2011/0264927 A1 | 10/2011 | Dearborn et al. | |
| 2012/0262120 A1 | 10/2012 | Dresser, III | |
| 2013/0113420 A1 | 5/2013 | Majoris | |
| 2014/0265760 A1 | 9/2014 | Layne et al. | |
| 2014/0268582 A1 | 9/2014 | Wong et al. | |
| 2014/0354214 A1 * | 12/2014 | Phelps | H02J 7/0044 320/137 |
| 2015/0036279 A1 | 2/2015 | Erdman et al. | |
| 2015/0061571 A1 | 3/2015 | Lin | |
| 2015/0137738 A1 | 5/2015 | Chien | |
| 2015/0188343 A1 | 7/2015 | Theis et al. | |
| 2015/0192968 A1 | 7/2015 | Lindblad et al. | |
| 2015/0200555 A1 | 7/2015 | An | |
| 2016/0072325 A1 | 3/2016 | Su et al. | |
| 2016/0154048 A1 * | 6/2016 | Lee | G01R 31/66 439/620.21 |
| 2016/0211687 A1 | 7/2016 | Wang et al. | |
| 2016/0372949 A1 | 12/2016 | Mccaffrey et al. | |
| 2017/0027079 A1 | 1/2017 | Dombrowski et al. | |
| 2017/0133868 A1 | 5/2017 | Hsu et al. | |
| 2017/0155260 A1 | 6/2017 | Chen et al. | |
| 2017/0187205 A1 | 6/2017 | Li et al. | |
| 2017/0264117 A1 | 9/2017 | Deutsch et al. | |
| 2017/0279294 A1 | 9/2017 | Fujii | |
| 2017/0371374 A1 | 12/2017 | Carnevali | |
| 2018/0019604 A1 | 1/2018 | Yuan et al. | |
| 2018/0025573 A1 | 1/2018 | Yuan et al. | |
| 2018/0175646 A1 | 6/2018 | Chen | |
| 2018/0226828 A1 | 8/2018 | Files et al. | |
| 2018/0262030 A1 | 9/2018 | Zadvinskis | |
| 2018/0375354 A1 | 12/2018 | Ergun et al. | |
| 2019/0027944 A1 * | 1/2019 | Grzybowski | H02J 7/0013 |
| 2019/0267818 A1 | 8/2019 | Bonilla et al. | |
| 2019/0267820 A1 | 8/2019 | Lee | |
| 2019/0288529 A1 | 9/2019 | Kulick | |
| 2020/0109310 A1 * | 4/2020 | Gadda | C08G 18/73 |
| 2020/0185873 A1 * | 6/2020 | Leonard | H01R 43/26 |

FOREIGN PATENT DOCUMENTS

| | | |
|---|---|---|
| GB | 2507714 A | 5/2014 |
| JP | 2015213426 A | 11/2015 |
| JP | 6173397 B2 | 8/2017 |
| KR | 101165939 B1 | 7/2012 |
| KR | 200464110 Y1 | 12/2012 |
| KR | 101262301 B1 | 5/2013 |
| KR | 20140040185 A | 4/2014 |
| KR | 200478433 Y1 | 10/2015 |
| KR | 10-1678556 | 11/2016 |
| KR | 101736782 B1 | 5/2017 |
| KR | 200486212 Y1 | 4/2018 |
| TW | M 424624 U | 3/2012 |
| WO | WO 2014168732 A1 | 10/2014 |
| WO | WO 2016010661 A1 | 1/2016 |

OTHER PUBLICATIONS

CUBE Toploader widencdn.com webpage accessed Oct. 25, 2019.
Mobile Device Charging Module—Spectrumfurniture.com webpage accessed Oct. 25, 2019.
Cloud 32 chromebook cart spectrumfurniture.com webpage accessed Oct. 25, 2019.

* cited by examiner

DOCKING COMPUTER STORAGE SYSTEM

CROSS-REFERENCE TO RELATED APPLICATIONS

This application claims priority to U.S. Provisional Patent Application No. 63/061,311, filed Aug. 5, 2020, entitled "Docking Computer Storage System", the content of which is hereby incorporated herein by reference.

FIELD

The present invention relates to laptop computer storage systems and, more particularly, to a docking laptop computer storage system with an improved docking alignment system.

BACKGROUND

Groups of portable computing devices, such as laptop computers, tablet computers, and other computing devices, are commonly used in educational facilities to enrich the curriculum provided to students. As used herein, the term "laptop computer" will be used to refer to any of these types of portable computing devices.

Laptop computer storage systems, such as deck and wall mounted cabinets, and computer carts, have been developed which may be used to store groups of laptop computers and to synchronize and charge the laptop computers while they are being stored. Generally, a laptop computer storage system that is wall or desk mounted is used within one classroom, whereas a computer cart has castors that enable the group of laptop computers to be moved within the facility, such as between classrooms.

Laptop computer storage systems often have wires that are used to plug into the laptop computers when the computers are inserted into the storage system, so that the laptop computers can be synchronized and charged while they are being stored. Alternatively, the laptop computer storage systems can be implemented to include docking stations, in which the laptop computers are automatically connected to a connector when the laptop computer are inserted into the docking stations of the storage system.

Over time laptop computers have tended to become more powerful. To enable higher data rate transmission to/from the laptop computers, different connection standards have been promulgated over time. One such connector standard is referred to as USB-C. USB-C, formally known as USB Type-C, is a 24 pin USB rotationally symmetrical connector. The USB Type-C specification was initially published by the USB Implementers Form and was finalized in August of 2014.

Unfortunately, it is not straight-forward to design a docking systems based on the USB-C connector. Specifically, the USB-C connector provides very little lead-in, which means that it is very difficult to ensure that the male and female USB-C connectors align properly within the docking system. Mis-alignment between the female USB-C connector on the laptop computer and the male USB-C connector on the docking station during the docking process can result in damage to the computer and/or to the docking system. In an educational environment where the laptop computers are being taken out and replaced by students of various ages and coordination levels, the likelihood of misalignment increases. Accordingly, it would be advantageous to provide a new way of aligning laptop computers with connectors when the laptop computers are inserted into docking stations, such as docking stations in a laptop computer storage system.

SUMMARY

All examples and features mentioned below can be combined in any technically possible way.

A docking computer storage system has a plurality of docking bays for receiving laptop computers. A male USB-C connector is provided at the rear of each bay such that, when a laptop computer is inserted into the docking bay, the male USB-C connector in the docking bay will automatically engage a corresponding female USB-C connector on the laptop computer. To enable proper alignment between the male and female USB-C connectors, a floating circuit board subassembly is provided in each docking bay that has self-orienting inactive "dummy" male connectors configured to engage one or more female connectors on the laptop computer other than the USB-C connector. The purpose of the self-orienting inactive "dummy" male connectors is to align the male USB-C connector of the docking station with the female USB-C connector of the laptop computer. By using one or more self-orienting inactive "dummy" male connectors that are longer than the male USB-C connector, the self-orienting inactive "dummy" male connectors provide lead-in for the USB-C connector, to ensure alignment between the male and female USB-C connectors within the vertical, horizontal, and rotational alignment tolerance limits of the USB-C connectors.

DETAILED DESCRIPTION

This disclosure is based, at least in part, on the realization that it would be desirable to provide a docking laptop computer storage system in which the electrical connection between the docking laptop computer storage system and the laptop computers are based on USB-C.

Figure 1:
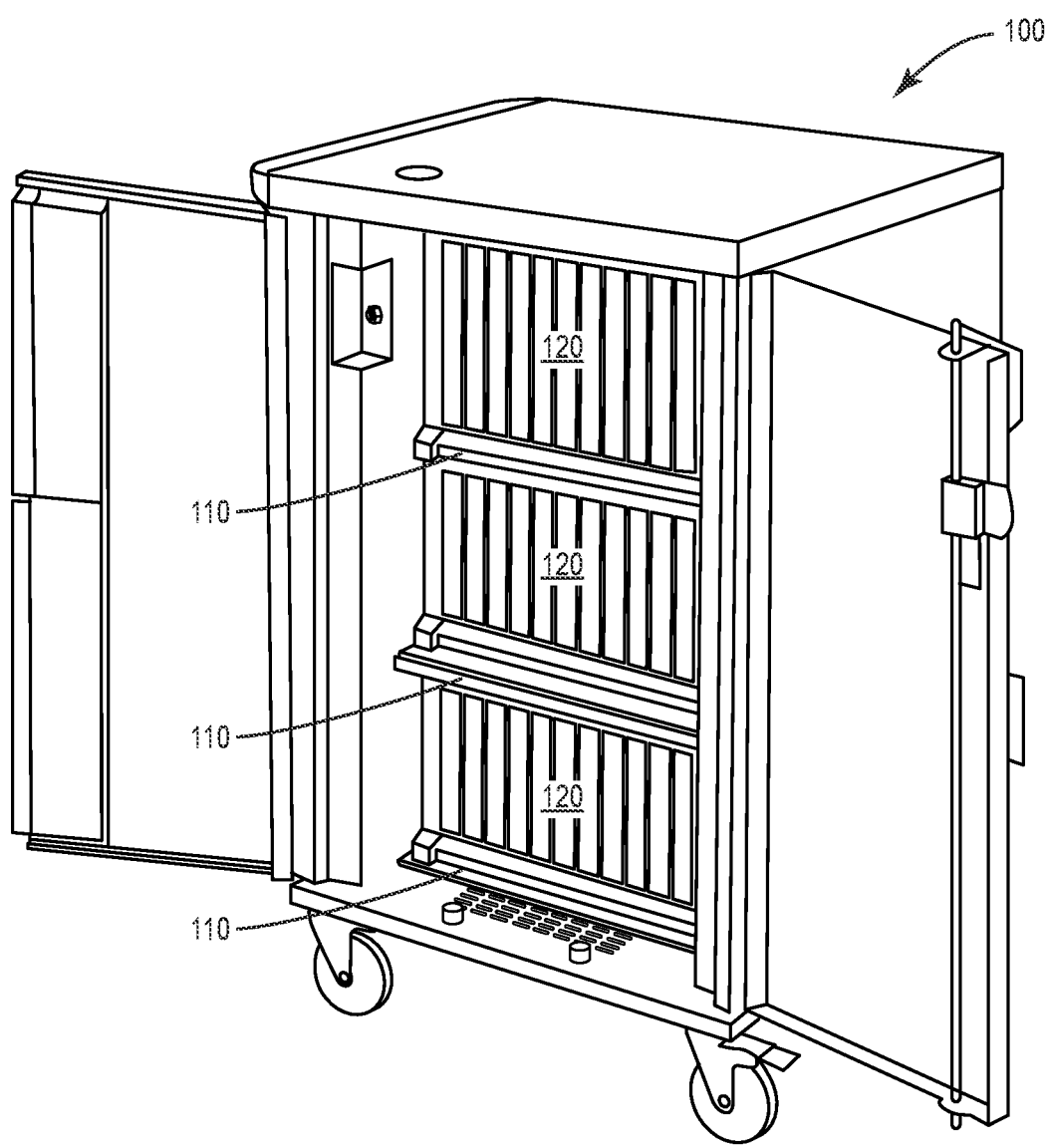
FIG. 1 is a front perspective view of an example docking laptop computer storage system implemented as a computer cart, according to some embodiments.

FIG. 1 is a front perspective view of an example docking laptop computer storage system 100 implemented as a computer cart, according to some embodiments. Although some embodiments of a docking laptop computer storage system will be described in connection with a computer cart, it should be understood that the alignment feature of the docking system may be used with other types of laptop computer storage systems as well, such as docking desktop storage systems, docking wall mounted storage systems, and docking lockers.

In the implementation shown in FIG. 1, the docking laptop computer storage system 100 has three shelves 110. Other storage systems 100 may have other numbers of shelves 110. In some embodiments, one of the shelves is implemented as the floor of the storage system. A docking shelf unit 120 is disposed on each of the shelves 110. The docking shelf unit 120 is shown in greater detail in connection with FIGS. 2 and 3. Although the embodiment shown in FIG. 1 has separate shelves 110 and docking shelf units 120, in some embodiments the docking bays 126 are built directly on the shelves 110.

Figure 2:
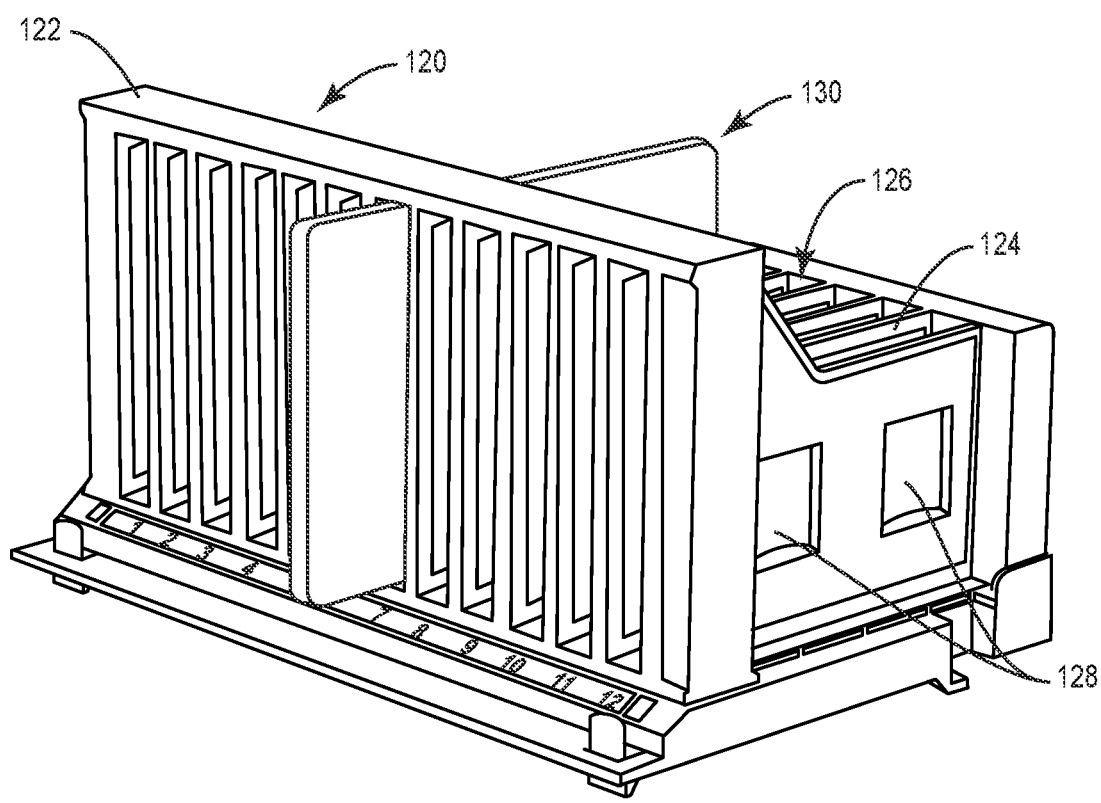
FIG. 2 is a front perspective view of an example docking shelf unit for use in a docking laptop computer storage system, such as the docking laptop computer storage system of FIG. 1, according to some embodiments.
Figure 3:
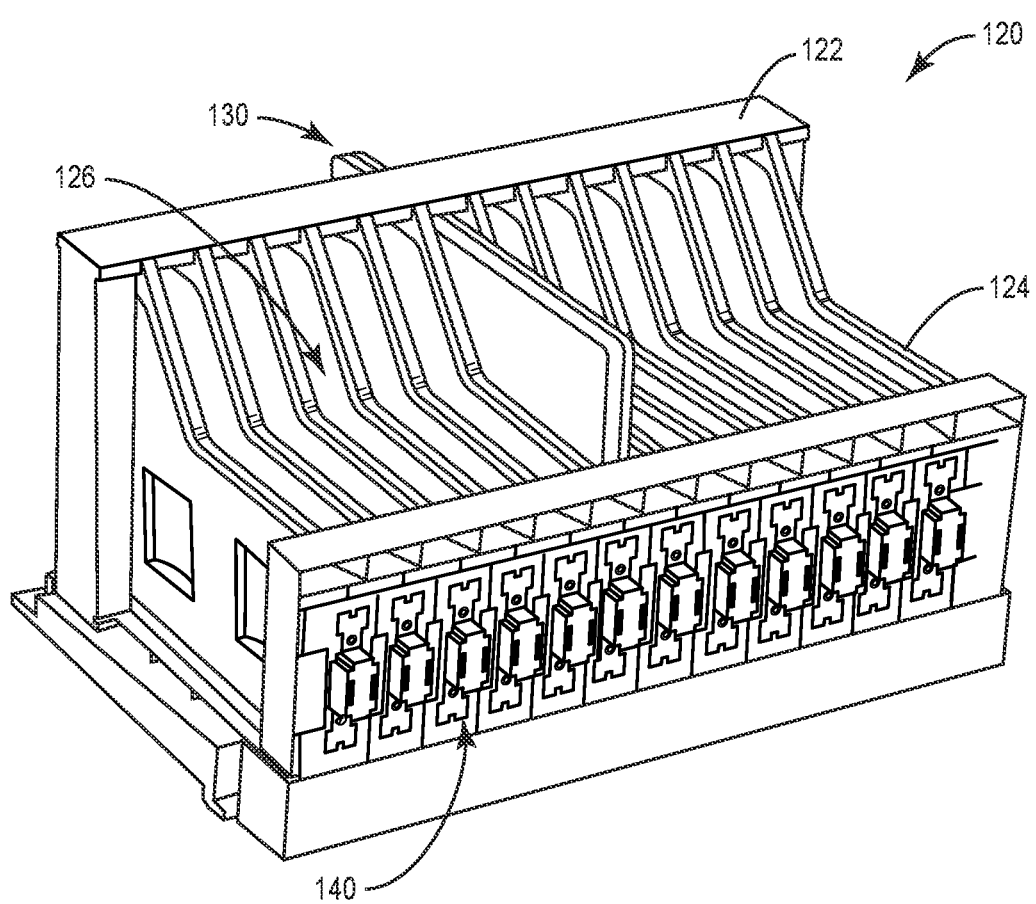
FIG. 3 is a rear perspective view of the example docking shelf unit of FIG. 2, according to some embodiments.

As shown in FIGS. 2 and 3, in some embodiments the docking shelf unit 120 includes a face plate 122 and a plurality of dividers 124 which define storage bays 126 for receiving laptop computers 130. In some embodiments the dividers 124 include leaf springs 128 which protrude into the storage bays 126 to bias the laptop computer 130 against the next adjacent divider. Biasing the laptop computer against one of the dividers within the storage bay 126 helps to generally align the laptop computer 130 with the docking connectors (discussed below) to assist with alignment of the laptop computer within the storage bay. Other structures such as rollers may be used as well or instead of the leaf springs 128.

Although only one laptop computer is shown in FIGS. 2 and 3, the docking shelf unit 120 in FIGS. 2 and 3 has 12 docking bays 126, which enables up to 12 laptop computers to be simultaneously connected to the docking shelf unit 120. Likewise, although the docking shelf unit 120 of FIGS. 2 and 3 has 12 docking bays 126, other docking shelf units may have greater or fewer docking bays 126 depending on the implementation.

FIG. 3 is a rear perspective view of the docking shelf unit 120. As shown in FIG. 3, in some embodiments a docking connector module 140 is disposed at the rear of each docking bay 126. The connection between the docking connector module 140 and the docking shelf unit 120, in some embodiments, is implemented using a floating connection that permits some relative movement between the docking connector module 140 and the docking bay 126 during the docking process.

As noted above, the USB-C connector does not provide significant lead-in, meaning that the male and female USB-C connectors do not naturally attempt to align with each other during the connection process.

To determine the tolerance limits of alignment of USB-C connectors, applicant created a test docking station in which a laptop computer (ChromeBook) with a female USB-C connector was aligned to mate a male USB-C connector of the docking station. Orientation of the male and female connectors was implemented using leaf springs on the top and sides of the docking bay, and the male USB-C connector was connected to the dock to be correctly positioned relative to the computer. Different thicknesses of tape were then applied to the bearing surfaces of the laptop to change the alignment between the USB-C female connector on the laptop computer, and the male USB-C connector on the docking station. This was done to determine how much the alignment could be off and still function. From this experiment, it was determined that the USB-C connection had a tolerance of +/−0.005 inches in the vertical direction and +/−0 0.022 inches in the horizontal direction, which are very narrow tolerances.

Figure 4:
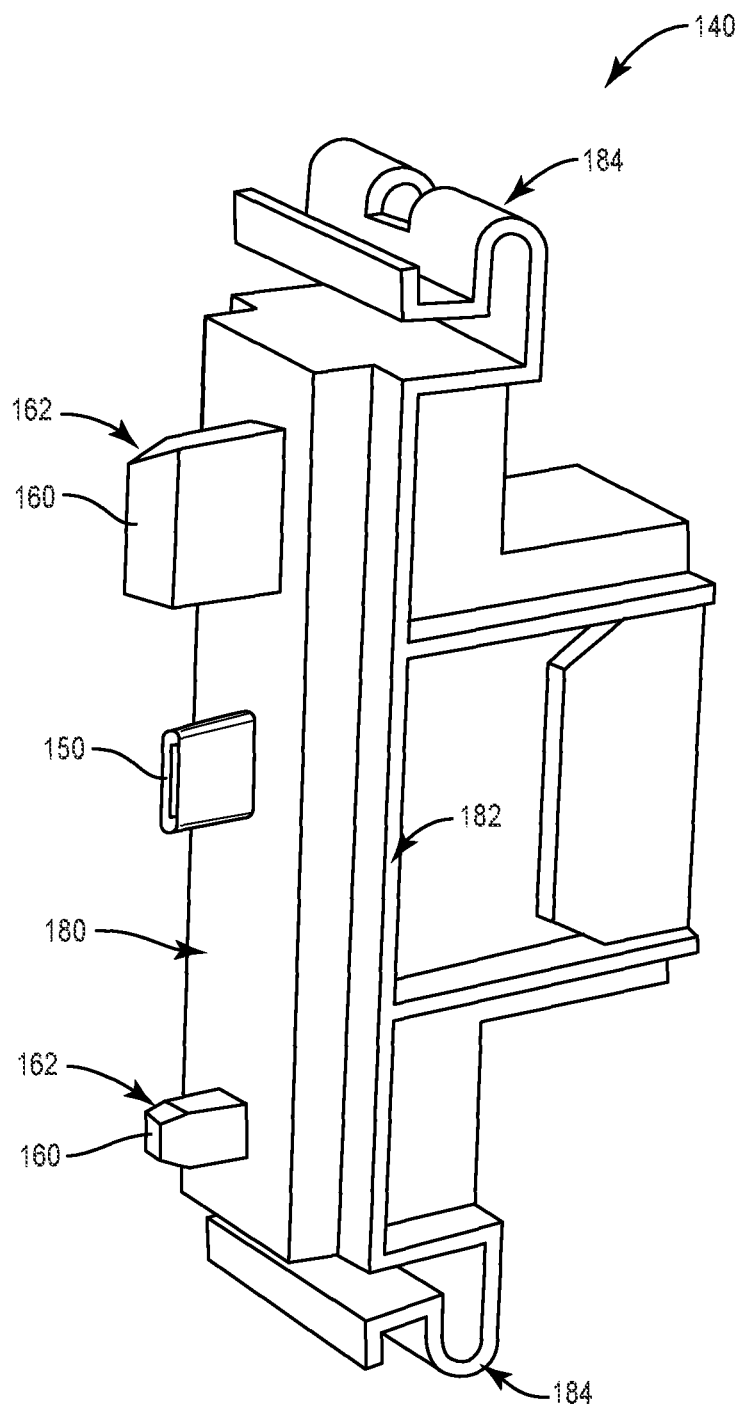
FIG. 4 is a front perspective view of an example docking connector module for use in the docking shelf unit of FIG. 2, according to some embodiments.

FIG. 4 shows an example docking connector module 140, according to some embodiments, that is designed to meet the stringent alignment tolerances required for proper mating of a male USB-C connector 150 of the docking connector module 140 and a female USB-C connector of the laptop computer 130. As shown in FIG. 4, in some embodiments the docking connector module 140 has one or more self-orienting inactive "dummy" male connectors 160 that are longer than the USB-C connector 150 and have tapered tips 162. The self-orienting inactive male connectors are spaced relative to the USB-C connector 150 to engage other female ports of the particular laptop computer that is going to be stored in the laptop computer storage system. Different laptop computers have different selections and arrangements of female ports, and the particular spacing of the self-orienting inactive "dummy" male connectors will depend on what type of ports are located on the particular make and model of computer is to be docked using the docking shelf unit 120.

By making the self-orienting inactive "dummy" male connectors 160 longer than the USB-C connector 150, the self-orienting inactive "dummy" male connectors 160 will engage the other female ports of the laptop computer 130 before the male and female USB-C connectors are able to make contact. The tapered tips 162 of the self-orienting inactive "dummy" male connectors 160 cause the docking connector module 150 to move into position relative to the computer 130 to ensure that the male and female USB-C connectors are sufficiently aligned when contact occurs between the male and female USB-C connectors. As noted above, the connection between the docking connection module 140 and the docking bay 126 is implemented using a floating connection, which enables this movement of the docking connection module 140 during the docking process, to enable the laptop computer 130 to cause the docking connection module 140 to move into correct alignment with the laptop computer during the docking process.

The self-orienting inactive "dummy" male connectors 160 may be implemented to engage numerous types of female ports on the laptop computers 130, depending on the implementation. Preferably, the self-orienting inactive "dummy" male connectors are configured to engage ports on the laptop computer that are relatively close to or adjacent to the female USB-C connector of the laptop computer. For example, in some embodiments the self-orienting inactive "dummy" male connectors are designed to fit into barrel jack ports, USB-A ports, USB-B ports, headphone jack ports, security slots such as a Kensington lock slots, and other female ports or apertures of the laptop computer 130. By using the other ports of the laptop computer to align the male and female USB-C connectors during the docking process, it is possible to achieve the required tolerances between the male and female USB-C connectors to reduce the likelihood of damaging one or more of the USB-C connectors.

Figure 5:
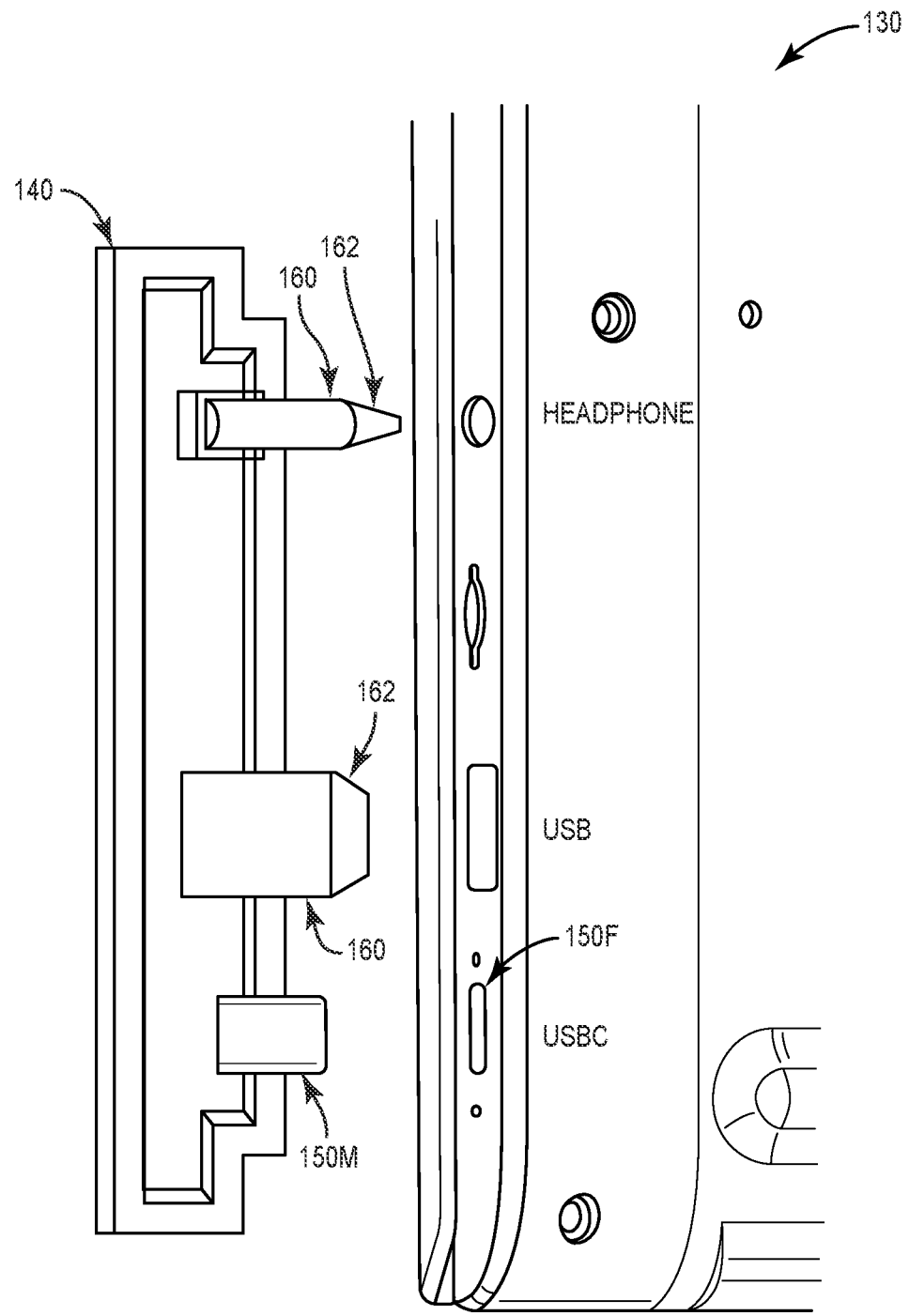
FIG. 5 is a side view of an example docking connector module and for use in the docking shelf unit of FIG. 2, and an example laptop computer, according to some embodiments.

FIG. 4 shows an implementation in which the laptop computer USB-B port and security slot, implemented as a Kensington lock slot, are used to align the USB-C male and female connectors. In this embodiment, the USB-C male and female connectors are intermediate the self-orienting inactive "dummy" male connectors. FIG. 5 shows an implementation in which the laptop computer headphone jack port and USB-B port of the laptop computer are used to align the USB-C male and female connectors. In this embodiment, the self-orienting inactive "dummy" male connectors are both above the male USB-C connector 150M and female USB-C connector 150F.

In some embodiments, the self-orienting inactive "dummy" male connectors 160 have tips that are tapered in two directions to cause both vertical and horizontal adjustment of the alignment between the USB-C connectors 160 when the self-orienting inactive "dummy" male connectors engage the respective ports of the laptop computer 130. For example, FIG. 5 shows one of the self-orienting inactive "dummy" male connectors configured to engage a respective headphone jack of the laptop computer 130, and shows the tip of the self-orienting inactive "dummy" male connector as having a conical tapered tip. Likewise, in FIG. 5, the self-orienting inactive "dummy" male connector that is designed to engage the USB-B connector of the laptop computer 130 has the side edges tapered toward each other, and similarly the top and bottom edges are tapered toward each other, to form a roughly pyramidal shape.

If a single self-orienting inactive "dummy" male connector is used, there is a possibility that the USB-C connectors might not be properly aligned, because the laptop computer might be rotated slightly relative to the docking connection module 140. In some embodiments, to ensure rotational alignment between the docking connection module 140 and laptop computer 130, at least two self-orienting inactive "dummy" male connectors are provided on the docking connection module.

In the embodiment shown in FIG. 4, the docking connector module 140 has a front face 180 on which the USB-C connector 150 and the self-orienting inactive "dummy" male connectors 160 are formed. In some embodiments, a vertical flange 182 is formed along two edges of the front face 180. In this embodiment, the front face is designed to go through an aperture in the docking bay 126 that is wider than the front surface, but narrower than the flange 182. In this manner, the docking connector module 140 is able to have a range of horizontal movement within the docking bay 126.

In some embodiments, as shown in FIG. 4, the docking connector module 140 has spring hooks 184 formed at top and bottom edges of the docking connector module. The spring hooks 184 engage the aperture of the docking bay 126 in which the docking connector module is disposed, and enable the docking connector module 140 to have a range of vertical movement within the docking bay.

Figure 6:
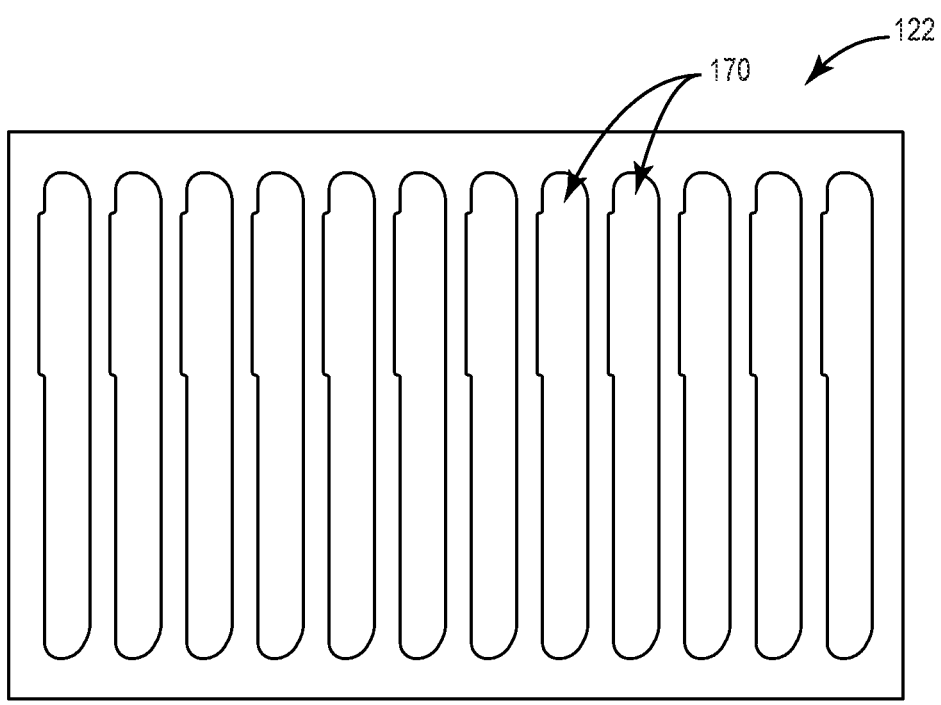
FIG. 6 is a front view of an example face plate for the docking shelf unit of FIG. 2, according to some embodiments.

FIG. 6 shows an example profile view of the face plate 122 of the docking shelf unit 120 in greater detail. In particular, a laptop computer will typically have a charging USB-C connector located at a particular location on the computer chassis, which means that the laptop computer will need to be inserted into the docking station in the correct orientation. Inserting the laptop computer into the docking station upside down, or backwards, will result in the laptop computer not being properly docked and can result in damage to the docking station. Accordingly, to ensure proper docking between the laptop computer and the docking connection module 140, it is important for the laptop computer to be inserted into the docking bay 126 in the correct orientation.

In some embodiments, as shown in FIG. 6, the face plate 122 has keyed apertures 170 that are designed to accommodate the particular shape of the laptop computer 130 in only one orientation, such as to prevent the laptop computer from being inserted into the docking bay 126 up-side-down or backwards. In this embodiment, the face plate 122 restricts the laptop computer to only fit into the docking bay 126 in the correct orientation, to prevent damage to the laptop computer 130 and/or to the self-orienting inactive "dummy" male connectors and male USB-C connector 150. Although the keyed apertures 170 in FIG. 6 have a particular shape, it should be realized that the particular shape of the keyed apertures will depend on the shape of the laptop computer and/or the exterior shape of a protective sleeve applied to the laptop computer.

A number of implementations have been described. Nevertheless, it will be understood that additional modifications may be made without departing from the scope of the inventive concepts described herein, and, accordingly, other implementations are within the scope of the following claims.

What is claimed is:

1. A docking laptop computer storage system, comprising:
    a plurality of dividers, each pair of adjacent dividers defining a docking bay in the docking laptop computer storage system;
    a plurality of docking connector modules, a respective one of the plurality of docking connector modules being positioned at a rear of a respective each one of the docking bays;
    wherein each docking connector module is positioned at the rear of the respective docking bay using a floating connection enabling horizontal and vertical relative movement of the docking connector module relative to the docking bay;
    wherein each docking connector module has a powered male connector and one or more inactive male connectors, the powered male connector being configured to deliver power to a corresponding female connector of a laptop computer when the laptop computer is inserted into the docking bay;
    wherein the one or more inactive male connectors are longer than the powered male connector and provide lead-in to the powered male connector during a docking process to facilitate movement of the respective docking connector module to align the powered male connector with the corresponding female connector of the laptop computer.

2. The docking laptop computer storage system of claim 1, wherein at least some of the dividers include leaf springs which protrude into the storage bays to bias laptop computers in those storage bays against respective next adjacent dividers.

3. The docking laptop computer storage system of claim 1, wherein the docking connector module includes a printed circuit board.

4. The docking laptop computer storage system of claim 1, wherein one of the inactive male connectors is configured to engage a respective headphone jack of the laptop computer.

5. The docking laptop computer storage system of claim 4, wherein the one of the inactive male connectors has a conical tapered tip.

6. The docking laptop computer storage system of claim 1, wherein one of the inactive male connectors is configured to engage a respective female USB-B port of the laptop computer.

7. The docking laptop computer storage system of claim 6, wherein the one of the inactive male connector has side edges tapered toward each other, and has top and bottom edges that are tapered toward each other, to form a roughly pyramidal shape.

8. The docking laptop computer storage system of claim 1, wherein one of the inactive male connectors is configured to engage a respective female security slot of the laptop computer.

* * * * *